(12) United States Patent
Garvey et al.

(10) Patent No.: US 12,323,012 B2
(45) Date of Patent: Jun. 3, 2025

(54) ELECTRIC MACHINE

(71) Applicant: ROLLS-ROYCE PLC, London (GB)

(72) Inventors: Seamus D Garvey, Nottingham (GB); Karuna Kalita, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/589,701

(22) Filed: Feb. 28, 2024

(65) Prior Publication Data

US 2024/0313622 A1 Sep. 19, 2024

(30) Foreign Application Priority Data

Mar. 17, 2023 (GB) ..................... 2303914

(51) Int. Cl.
*H02K 11/30* (2016.01)
*F02C 6/20* (2006.01)
(Continued)

(52) U.S. Cl.
CPC ............. *H02K 11/30* (2016.01); *F02C 6/20* (2013.01); *F02C 7/268* (2013.01); *H02K 1/146* (2013.01); *H02K 7/1823* (2013.01)

(58) Field of Classification Search
CPC ...... H02K 11/30; H02K 1/146; H02K 7/1823; H02K 11/20; H02K 3/28; H02K 7/09; F02C 6/20; F02C 7/268; F16C 32/0457; F16C 32/048; F16C 32/0497; F16C 32/0446; F16C 2360/23
See application file for complete search history.

(56) References Cited

U.S. PATENT DOCUMENTS

| | | | |
|---|---|---|---|
| 2005/0077793 A1* | 4/2005 | Garvey | H02K 7/09 310/90.5 |
| 2018/0180095 A1 | 6/2018 | Jastrzebski et al. | |
| 2020/0227988 A1* | 7/2020 | Zhu | H02K 16/02 |

FOREIGN PATENT DOCUMENTS

GB 2408390 A 5/2005

OTHER PUBLICATIONS

W.K.S. Khoo. "Bridge Configured Winding for Polyphase Self-Bearing Machines". IEEE Transactions on Magnetics, Apr. 2005, vol. 41, No. 4, pp. 1289-1295.
(Continued)

*Primary Examiner* — Joseph Ortega
(74) *Attorney, Agent, or Firm* — Oliff PLC

(57) ABSTRACT

An electric machine includes a stator having a phase arrangement, and a rotor. The phase arrangement includes first and second legs connected in parallel at first and second primary junctions. The legs each include first and second coils connected in series through a first intermediate junction. The intermediate junctions are connected by a branch such that the phase arrangement is a bridge circuit. The phase arrangement permits an alignment current to flow between the primary junctions via the branch, the alignment current being conducted through an alignment current path passing through one coil of each leg. The phase arrangement includes a negative impedance converter to add a negative electrical impedance to the alignment current path by introducing additional electrical energy into the respective alignment current path. The alignment current causes a translational force to be applied to the rotor for maintaining alignment of the rotor with respect to the stator.

16 Claims, 6 Drawing Sheets

(51) Int. Cl.
*F02C 7/268* (2006.01)
*H02K 1/14* (2006.01)
*H02K 7/18* (2006.01)

(56) References Cited

OTHER PUBLICATIONS

W.K.S. Khoo et al. "Practical Implementation of the Bridge Configured Winding for Producing Controllable Transverse Forces in Electrical Machines". IEEE Transactions on Magnetics, Jun. 2011, vol. 47, No. 6, pp. 1712-1718.

Jin Huang et al. "Analysis and Control of Multiphase Permanent-Magnet Bearingless Motor With a Single Set of Half-Coiled Winding". IEEE Transactions on Industrial Electronics, Jul. 2014, vol. 61, No. 7, pp. 3137-3145.

Ryohei Oishi et al. "A Novel Parallel Motor Winding Structure for Bearingless Motors". IEEE Transactions on Magnetics, May 2013, vol. 49, No. 5, pp. 2287-2290.

Akira Chiba et al. "A Principle and Test Results of a Novel Bearingless Motor With Motor Parallel Winding Structure". IEEE, 2013, pp. 2474-2479.

Sep. 20, 2023 Search Report issued in British Patent Application No. 2303912.6.

Sep. 20, 2023 Search Report issued in British Patent Application No. 2303914.2.

U.S. Appl. No. 18/589,674, filed Feb. 28, 2024 in the name of Seamus D Garvey et al.

Aug. 9, 2024 Search Report issued in British Patent Application No. 24156983.9.

Aug. 12, 2024 Search Report issued in British Patent Application No. 24156984.7.

* cited by examiner

ELECTRIC MACHINE

CROSS-REFERENCE TO RELATED APPLICATIONS

This specification is based upon and claims the benefit of priority from United Kingdom Patent Application No. 2303914.2, filed on 17 Mar. 2023, the entire contents of which are incorporated herein by reference.

TECHNICAL FIELD

This disclosure concerns an electric machine comprising a stator, a rotor configured to rotate relative to the stator and a phase arrangement. The disclosure further concerns a gas turbine engine comprising an electric machine.

BACKGROUND

In view of current industrial trends and objectives, it is desirable to incorporate a greater degree of electrical functionality on an airframe and/or on a gas turbine engine. However, various technical challenges are associated with reliably and effectively extracting electrical energy from and/or providing electrical energy to a gas turbine engine during operation. In particular, vibrational energy and/or heat energy originating from a gas turbine engine present a challenging operational environment for any electric machine which is to be coupled to a gas turbine engine for this purpose. Further, strict mass and size penalties associated with any components which are to be incorporated within a gas turbine engine present further technical challenges in the design of an electrical machine which is configured to extract electrical energy from and/or provide electrical energy to a gas turbine engine during operation. Accordingly, it is desirable to provide an improved electrical machine which is capable of better meeting these challenges.

US 2005/0077793 A1 describes a rotating electric machine comprising two major components capable of relative rotation about a common axis and separated by an air gap in which magnetic fields linking the two main components through the air gap act both to exert torque and lateral forces. A set of windings is present on at least one of these components and this set of winding is used to generate a distribution of flux having two parts: the first part serving primarily to cause torque and the second part serving to cause a net lateral force between the two main components. The machine uses the physical connection of the coils within the phases of the machine such that separate sources can be used for supplying currents for generating torque and lateral forces independently.

SUMMARY

According to a first aspect, there is provided an electric machine comprising a stator, a rotor configured to rotate relative to the stator, the stator having a phase arrangement, wherein the phase arrangement includes a first leg and a second leg connected in parallel at a first primary junction and a second primary junction; the first leg includes a first-leg first coil and a first-leg second coil connected in series through a first intermediate junction; the second leg includes a second-leg first coil and a second-leg second coil connected in series through a second intermediate junction, the first intermediate junction and the second intermediate junction being connected by a branch such that the phase arrangement is in the form of a bridge circuit; the phase arrangement is configured to conduct, through each leg, a motor current through the respective in series coils between the first primary junction and the second primary junction; the phase arrangement is configured to permit an alignment current to flow between the first primary junction and the second primary junction via the branch, the alignment current being conducted through an alignment current path which passes through one coil of each leg; the alignment current path has a positive electrical impedance provided by the coils of each leg; the phase arrangement includes a negative impedance converter configured to add a negative electrical impedance to the alignment current path by introducing additional electrical energy into the respective alignment current path; and the electric machine is configured so that: the motor currents cause a torque to be applied to the rotor for rotation relative to the stator, and the alignment current causes a translational force to be applied to the rotor for maintaining alignment of the rotor with respect to the stator. Each coil may comprise a plurality of turns. A negative impedance converter as defined herein may also be known or referred to as a negative impedor.

The alignment current path may flow via the branch to bypass at least one coil of each leg. Accordingly, an alignment current which passes through one coil of each leg may flow through a proper subset of the coils on a leg (i.e., not through all coils of the leg), for example flowing through only the first-leg first coil and the second-leg second coil (via the branch), or flowing through only the second-leg first coil and the first-leg second coil (via the branch).

It may be that the negative impedance converter is configured to control the additional electrical energy introduced to the alignment current path such that a magnitude of the negative electrical impedance added to the alignment current path is less than a magnitude of a total positive electrical impedance of the alignment current path. The total positive impedance of an alignment current path may include the positive impedance provided by the respective coils of each leg and a positive impedance provided by any other components of the alignment current path.

The negative impedance converter may be configured to control the additional electrical energy introduced to the alignment current path such that the magnitude of the negative electrical impedance added to the alignment current path is no greater than 95% of the magnitude of the total positive electrical impedance of the alignment current path. Also, the electric machine may further comprise a monitoring arrangement configured to determine the positive electrical impedance of each alignment current path, and wherein the respective negative impedance converter is configured to control the additional electrical energy introduced to the alignment current path based on the determined positive electrical impedance of the alignment current path.

The negative impedance converter may be positioned on the branch connecting the first intermediate junction and the second intermediate junction. The negative impedance converter may comprises a current source and a ballast impedance converter connected in parallel. It may be that the ballast impedance converter includes a ballast resistor and/or a ballast inductor. The current source may include a switched-mode power-electronic drive. Otherwise, the negative impedance converter may comprise an operational amplifier circuit.

In addition, it may be that the stator comprises a set of stator teeth, the set of stator teeth including a first stator tooth and a second stator tooth diametrically opposed to one another. Also, the phase arrangement is provided to the set of stator teeth such that: the first-leg first coil and the second-leg first coil form part of a first stator tooth coil-grouping, the first-leg second coil and the second-leg second coil form part of a second stator tooth coil-grouping, and each stator tooth coil-grouping is provided to at least one stator tooth of the set of stator teeth. Each stator tooth may comprise a soft magnetic material. Each coil-grouping may be wound around the at least one stator tooth to which it is provided.

It may also be that the set of stator teeth is one of a plurality of sets of stator teeth; each set of stator teeth is angularly offset with respect to each other around a circumference of the stator; and the phase arrangement is one of a plurality of phase arrangements, each phase arrangement being provided to a respective set of stator teeth.

The electric machine may further comprise an input system configured to provide a respective alternating-current voltage to each phase arrangement, each alternating-current voltage having a different phase.

According to a second aspect there is provided a gas turbine engine comprising the electric machine according to the first aspect, wherein the rotor of the electric machine is mechanically coupled to a spool of the gas turbine engine. The rotor of the electric machine may be arranged coaxially with the spool of the gas turbine engine. The electric machine may be disposed within a core of the gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
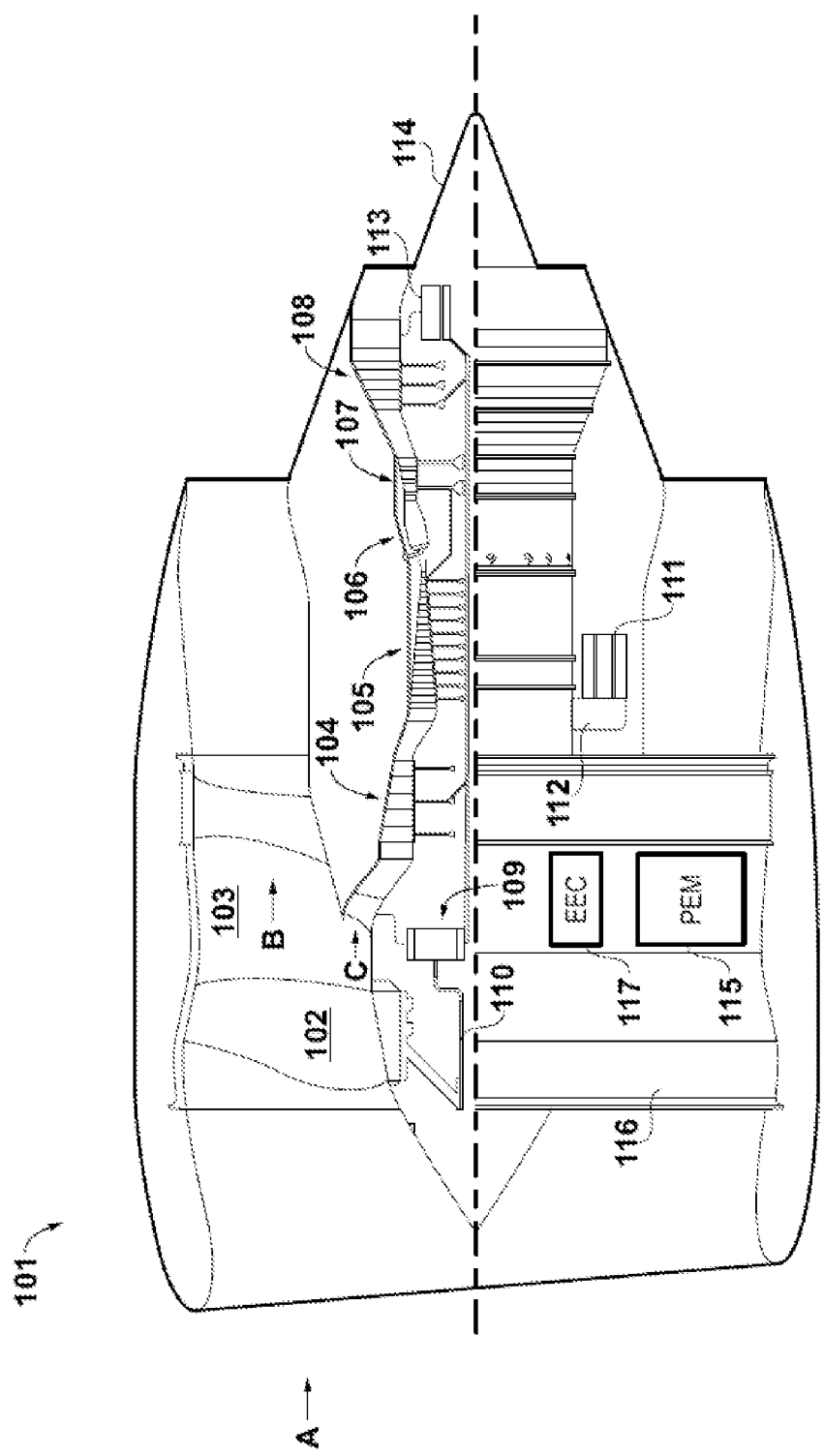
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high-pressure spool and a second rotary electric machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more DC busses. The DC busses allow for the distribution of electrical power to other engine electrical loads and to electrical loads on the airframe. The DC busses may further receive electrical power from, or deliver electrical power to, an energy storage system such as one or more battery modules or packs.

Those skilled in the art will appreciate that the gas turbine engine 101 described above may be regarded as a 'more electric' gas turbine engine because of the increased role of the electric machines 111, 113 compared with those of conventional gas turbines.

Figure 2:
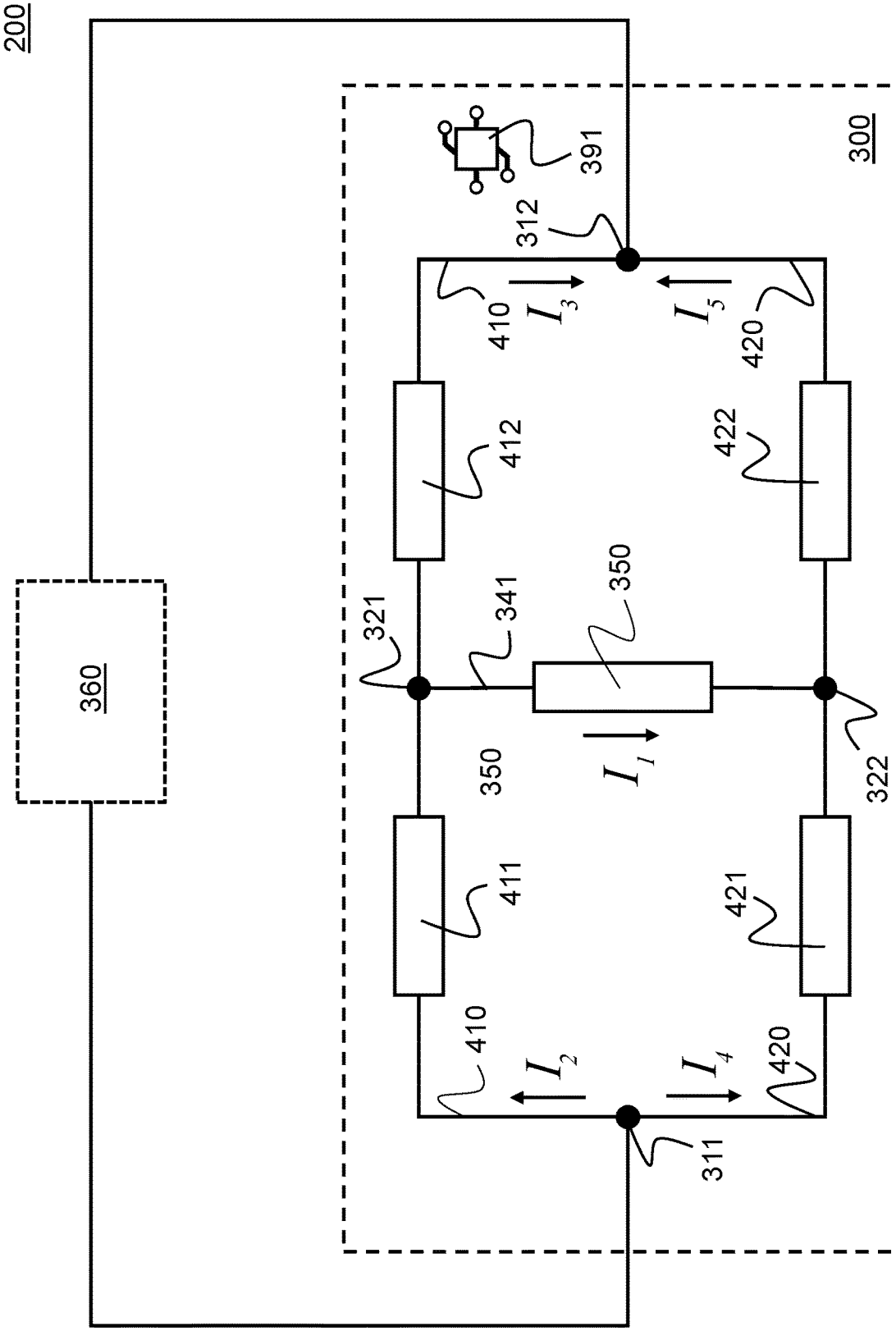
FIG. 2 is a circuit diagram which shows an electrical topology of an example electric machine.
Figure 3:
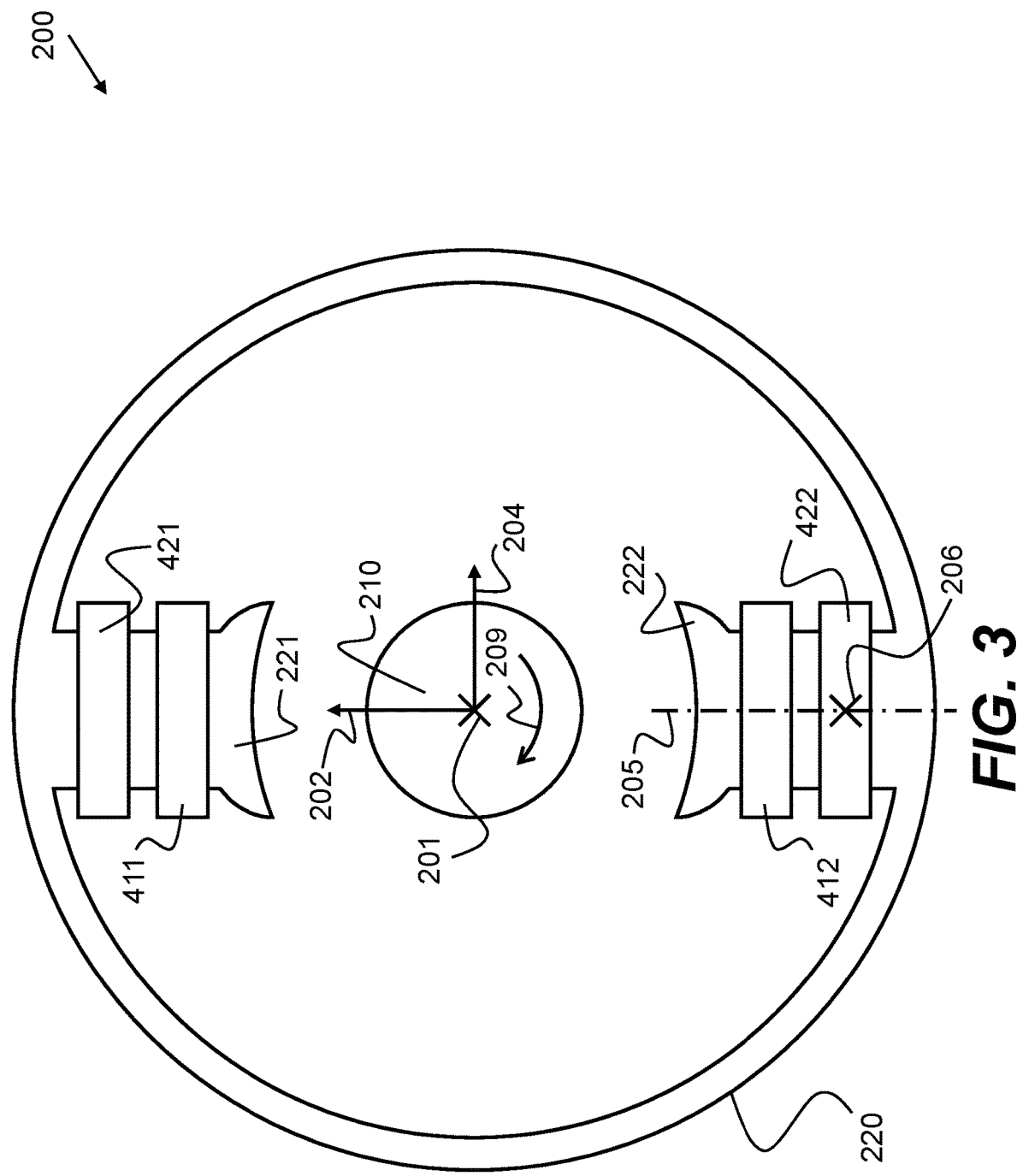
FIG. 3 shows a cross-sectional view of the example electric machine of FIG. 2.

FIG. 2 is a circuit diagram which shows an electrical topology of an example rotary electric machine 200. FIG. 3 shows a schematic cross-sectional view of the example rotary electric machine 200. The following description refers to features of both FIGS. 2 and 3.

As shown in FIG. 3, the electric machine 200 includes a rotor 210 and a stator 220. In use, the rotor 210 rotates relative to the stator 220 about a central axis 201 of the rotor as indicated by arrow 209, while the stator 220 is static (i.e., has a fixed local angular position about the central axis 201). During operation, the electric machine 200 may function as a motor, in which case the rotor 210 may be mechanically coupled to a mechanical system such that the rotor 210 drives the mechanical system in use. The mechanical system provides a mechanical load and may otherwise be referred to as a mechanical load. Conversely, during operation, the electric machine 200 may function as a generator, in which case the rotor 210 may be mechanically coupled to a mechanical system such that the mechanical system drives the rotor 210 in use. In particular, the rotor 210 may be mechanically coupled to a spool of a gas turbine engine, such that the spool of the gas turbine engine may be driven by the rotor 210 and/or may drive the rotor 210 as a mechanical system in use. As discussed above with reference to FIG. 1, this arrangement enables the generation of electrical power while the gas turbine engine is running, the driving of the spool to start of the engine instead of, for instance, an air turbine starter and/or the facilitation of mechanical power transfer between different spools to improve operability, fuel consumption and the like. Further, the rotor 210 of the electric machine 200 may be arranged coaxially with a spool of the gas turbine engine (or coaxially with the turbomachinery of the gas turbine engine). This enables the electric machine 200 to be advantageously disposed within a core of the gas turbine engine, which provides a compact and simple arrangement for integrating the electric machine 200 within a gas turbine engine.

The stator 220 comprises a first stator tooth 221 and a second stator tooth 222, which together form, or form part of, a set of stator teeth. The first stator tooth 221 and the second stator tooth 222 are diametrically opposed to one another with respect to the central axis 201. Each stator tooth 221, 222 is configured to support a magnetic field, and to this end may comprise a soft magnetic material (that is, a material having an intrinsic coercivity no greater than, for example, 1000 A/m). As best shown in FIG. 2, the stator 220 of electric machine 200 comprises (e.g., carries) a phase arrangement 300. The phase arrangement 300 may also be referred to as a coil arrangement 300 or as a phase coil arrangement 300. The phase arrangement 300 includes a first leg 410 and a second leg 420. The first leg 410 and the second leg 420 are connected in parallel at a first primary junction 311 and a second primary junction 312. Each leg 410, 420 includes a plurality of coils. Each coil is formed of an electrically conductive material which is suitable for being wound around (or within) a magnetic material. Further, each coil has a number of turns, the number of turns being a number of times around a magnetic material (e.g., the respective stator tooth) which the electrically conducting material from which the coil is formed is to be wound.

The first leg 410 includes a first-leg first coil 411 and a first-leg second coil 412, whereas the second leg 420 includes a second-leg first coil 421 and a second-leg second coil 422. The first-leg first coil 411 and the first-leg second coil 412 are connected in series through a first intermediate junction 321. Similarly, the second-leg first coil 421 and the second-leg second coil 422 are connected in series through a second intermediate junction 322. A branch 341 connects the first intermediate junction 321 and the second intermediate junction 322, such that the phase arrangement 300 is in the general form of a bridge circuit (e.g., a Wheatstone bridge circuit). The legs 410, 420 may be referred to as parallel paths or parallel branches in the context of the bridge circuit, as will be understood by those skilled in the art.

In this example, the first-leg first coil 411 and the second-leg first coil 421 are wound around the first stator tooth 221 such that the first-leg first coil 411 and the second-leg first coil 421 each form a part of a first stator tooth coil-grouping. Conversely, the first-leg second coil 412 and the second-leg second coil 422 are wound around the second stator tooth 222 such that the first-leg second coil 412 and the second-leg second coil 422 each form a part of a second stator tooth coil-grouping.

In the example of FIG. 3, the first stator tooth coil-grouping is provided to (e.g., wound around) the first stator tooth 221 and the second stator tooth coil-grouping is provided to the second stator tooth 222. Therefore, each stator tooth coil-grouping is provided to a single stator tooth. However, this disclosure envisages that each stator tooth coil-grouping may be provided to (e.g., span across) a plurality of stator teeth.

Accordingly, each coil which forms part of a respective stator tooth coil-grouping is arranged coaxially with each other coil which forms part of the same stator tooth coil-grouping (i.e., coaxial with respect to a local radial axis 205 extending through the respective coil).

The electric machine 200 includes an input system 360 which is electrically connected to the first primary junction 311 and the second primary junction 312 and is configured to provide a single phase of an alternating-current (AC) input voltage to the primary junctions 311, 312 of the phase arrangement 300. Accordingly, the phase arrangement 300 is associated with only a single phase of an AC input voltage. In accordance with the present disclosure, an electric machine can comprise a plurality of such phase arrangements, with each phase arrangement being associated with a respective phase of an AC input voltage (see the description of FIG. 6 below). Each of the coils is configured to generate a magnetic field when an electric current is conducted therethrough. The rotor 210 comprises an arrangement of rotor poles (i.e., magnetic regions) which are responsive to the magnetic field produced by the coils. Appropriate types and arrangements of rotor poles within the rotor 210 will be known to those skilled in the art and may include either or both permanent magnets and electromagnets.

In particular, the rotor poles of the rotor 210 are responsive to a motor component of the magnetic field produced by the coils such that a torque is applied to the rotor 210 by the motor component of the magnetic field generated by the coils when magnetised. The motor component of the magnetic field is generated as a result of a magnetising motor current which flows through the respective coils of each of the legs 410, 420 between the first primary junction 311 and the second primary junction 312. The motor currents are specifically defined as the average conventional currents which flow in parallel through the legs of the phase arrangement 300, 300B, 300C between the first primary junction 311 and the second primary junction 312, respectively. The electric machine 200 is arranged so that, in use, the motor currents passing through each leg 410, 420 cause a torque to be applied to the rotor 210 for rotation relative to the stator 220, by means of the motor component of the magnetic field produced by the coils as a consequence of the motor currents flowing therethrough. However, the motor currents balance each other and so do not cause any translational force to be applied to the rotor 210. The motor currents in each leg generally balance each other owing to the similar configuration of the legs.

The phase arrangement 300 is also configured to permit an alignment current to flow between the first primary junction 311 and the second primary junction 312, along an alignment current path which passes through one coil of each leg 410, 420 via the branch 341 (e.g., to bypass at least one coil of each leg 410, 420, for example by flowing through only one coil of each leg 410, 420). For example, between the first intermediate junction 321 and the second primary junction 312, each alignment current is superimposed on any motor current which flows through the respective leg from the first primary junction 311 to the second primary junction 312. When the alignment current flows through the alignment current path, an alignment component of the magnetic field is generated in addition to the motor component of the magnetic field as previously described. The magnetic field generated by the coils may therefore be considered to comprise both the motor component and the alignment component when an alignment current is flowing along the alignment current path. The rotor poles of the rotor 210 are responsive to the alignment component of the magnetic field produced by the coils such that a translational force is applied to the rotor 210 by the alignment component of the magnetic field generated by the coils. The translational force applied to the rotor 210 by the alignment component of the magnetic field may be referred to as unbalanced magnetic pull (UMP).

In the phase arrangement 300 shown in FIG. 2, there are a plurality of alignment current paths which pass through one coil of each leg 410, 420 and through the branch 341. These include: a first alignment current path via the first-leg first coil 411 and the second-leg second coil 422; and a second alignment current path via the second-leg first coil 421 and the first-leg second coil 412.

The interaction between the rotor poles of the rotor 210 and the motor component of the magnetic field produced by the coils is not adversely affected by the presence of the alignment component of the magnetic field, such that the alignment current does not cause any significant alteration in the torque (e.g., no first order alteration in the torque) which is caused to be applied to the rotor 210 as a result of the motor currents flowing between the primary junctions 311, 312. In particular, no substantial torque is caused to be applied to the rotor 210 as a result of the alignment current flowing along the branch 341. The origin and effect of the alignment current will now be described in further detail.

The electrical impedance of each coil is dependent on the electrical characteristics of each coil as well as the proximity of the rotor poles of the rotor 210 to the respective coil when the latter is magnetised, as will be apparent to those skilled in the art. The electrical characteristics of each coil include the number of turns of the respective coil. References herein to the concept of electrical impedance should be understood as including either or both electrical resistance and electrical reactance (i.e., inductance and/or capacitance) unless indicated otherwise. Each coil may be defined by a characteristic distance to the centre of the stator 220 as measured from a geometrical centre 206 of the respective coil. The geometrical centre 206 of each coil is representative of the proximity of the rotor poles of the rotor 210 to the respective coil when the central axis 201 of the rotor 210 is aligned with a centre of the stator 220. Consequently, the characteristic distance is directly related to the electrical impedance of the respective coils when the rotor 210 is in alignment with the stator 220 and when the respective coil is magnetised with an electrical current. The electrical characteristics and the characteristic distance to the centre of the stator 200 of each coil are chosen such that when the rotor 210 is aligned with respect to the stator 220 (i.e., when the central axis 201 of the rotor 210 is aligned with a centre of the stator 220), the impedance of each of the coils is equal and the bridge circuit is therefore balanced. Because the bridge circuit is balanced, no potential difference between the intermediate junctions 321, 322 exists and so no electric current passively flows along the branch 341, and so no alignment current flows between the first primary junction 311 and the second primary junction 321.

If, however, the rotor 210 is translationally displaced or perturbed away from the centre of the stator 220 and towards either the first tooth 221 (and away from the second tooth 222) or towards the second tooth 222 (and away from the first tooth 221), the impedance of each of the coils of the phase arrangement 300 varies accordingly. Accordingly, the bridge circuit is no longer balanced and a potential difference between the intermediate junctions 321, 322 arises which passively instigates a differential current to flow along the branch 341 between the respective intermediate junctions 321, 322. According to the present disclosure, the passively-instigated differential current forms the alignment current, and the two may be referred to interchangeably.

Depending on the direction in which the central axis 201 of the rotor 210 is translated away from the centre of the stator 220, the alignment current may flow from the first intermediate junction 321 to the second intermediate junction 322 or vice versa.

For instance, if the bridge circuit is no longer balanced such that the potential difference at the first intermediate junction 321 is higher than the potential difference at the second intermediate junction 322, a positive differential current (that is, a conventional current) is passively-instigated to flow from the first intermediate junction 321 to the second intermediate junction 322 (labelled as $I_1$ in FIG. 2). The conventional current flowing from the first primary junction 311 to the first intermediate junction 321 (labelled as $I_2$ in FIG. 2) is therefore greater than the conventional current flowing from the first intermediate junction 321 to the second primary junction 312 (labelled as $I_3$ in FIG. 2), and the conventional current flowing from the first primary junction 311 to the second intermediate junction 322 (labelled as $I_4$ in FIG. 2) is smaller than the conventional current flowing from the second intermediate junction 322 to the second primary junction 312 (labelled as $I_5$ in FIG. 2).

The following analysis of the above scenario according to Kirchhoff's circuit laws is provided. A total current flowing out of the first primary junction 311 may be considered to be equal to a sum of $I_2$ and $I_4$. Conversely, a total current flowing into the second primary junction 312 may be considered to be equal to a sum of $I_3$ and $I_5$. A total current flowing into the first intermediate junction 321 is equal to $I_2$ whereas a total current flowing out of the first intermediate junction 321 is equal to a sum of $I_1$ and $I_3$. Therefore, $I_2=I_1+I_3$. Similarly, a total current flowing into the second intermediate junction 322 is equal to a sum of $I_1$ and $I_4$ whereas a total current flowing out of the second intermediate junction 322 is equal to $I_2$. Therefore, $I_5=I_1+I_4$. Consequently, the total current flowing out of the first primary junction 311 may be written as $I_1+I_3+I_4$ and the total current flowing into the second primary junction 312 may also be written as $I_1+I_3+I_4$. The positive differential current, $I_1$, is equal to the alignment current referred to herein, whereas the conventional current flowing from the first primary junction 311 to the second intermediate junction 322, $I_4$, is equal to a first motor current and the conventional current flowing from the first intermediate junction 321 to the second primary junction 312, $I_3$, is equal to a second motor current. The conventional current flowing from the second intermediate junction 322 to the second primary junction 312, $I_5$, is a result of a superimposition of the first motor current, $I_4$, and the alignment current, $I_1$ while the conventional current flowing from the first primary junction 311 to the first intermediate junction 321, $I_2$, is a result of a superimposition of the second motor current, $I_3$, and the alignment current, $I_1$.

For this reason, the alignment current(s) have been described herein as flowing between the first primary junction 311 and the second primary junction 321 via the branch 341. However, this should not be understood as requiring that the total current flowing between the first primary junction 311 and the second primary junction 321 must change in order for the alignment current(s) to flow. In particular, it may be that the second motor current and the first motor current are reduced when the alignment current flows, such that the total current flowing between the first primary junction 311 and the second primary junction 321 does not change even when there is an alignment current.

Accordingly, in the present disclosure, the alignment current is considered to be and described as a current which may be superimposed on a motor current along portions of a respective leg, such that the motor current is also considered to be constant along the respective leg 410, 420 (e.g., on either side of the intermediate junctions 321, 322), despite the total (i.e., superimposed) currents along the respective leg varying either side of a respective intermediate junction 321, 322.

Nevertheless, in an equally correct but alternative conceptualisation of the alignment current(s), alignment current(s) may be described as the current flowing across the branch 341. If so, the first and second motor currents may be described as varying along the respective leg 410, 420 (e.g., on either side of the intermediate junctions 321, 322) corresponding to the addition of the respective alignment current that flows into or out of the respective intermediate junction 321, 322 from or into the branch 341.

The electric machine 200 is configured so that the alignment current passing through one coil of each leg 410, 420 causes a translational force to be applied to the rotor 210 for maintaining alignment of the rotor 210 with respect to the stator 220 by means of the alignment component of the magnetic field produced by the coils as a consequence of the alignment current flowing therethrough. The translational force associated with the alignment current generally results in a translation in the opposite direction to the direction in which the rotor 210 has been translationally displaced or perturbed away from the centre of the stator and towards the respective stator tooth. The translational force may be considered to act in a direction which opposes a rotation of a central axis 209 of the rotor 210 around a geometrical centre of the stator 220 (similar to the central axis 209 orbiting the geometrical centre of the stator 220), the action of which may realign the central axis 209 of the rotor 210 with the geometrical centre of the stator 220 as such rotation progresses. In addition, a magnitude of the alignment current is a consequence of a magnitude of the potential difference between the intermediate junctions 321, 322, which is in turn dependent on a magnitude of the changes in impedance of the respective coils brought about by a change in the proximity of the rotor poles of the rotor 210 to the respective coils. As a result, a magnitude of the translational force is dependent on a magnitude of the displacement of the rotor 210 away from the centre of the stator 220 and toward the respective stator tooth. In this way, the translational force associated with the alignment current is broadly proportional to the displacement of the rotor 210 away from the centre of the stator 220.

The electrical machine 200 is therefore able to provide a translational force to the rotor 210 when the rotor 210 is brought out of alignment (i.e., misaligned) with the centre of the stator 220 by, for instance, an external force. The external force may originate from, for example, the mechanical system to which the rotor 210 is configured to be coupled. The external force may rapidly vary in time such that the rotor 210 is subject to oscillatory translation (that is, is subject to vibration). In particular, it may be that the rotor 210 is prone to vibrate excessively at specific rotational speeds of the rotor 210 (referred to as critical speeds), which if unmitigated, may cause damage to the electric machine 200 and/or the mechanical system. However, the translational force associated with the alignment current acts to reduce displacement of the rotor 210 toward a respective stator tooth 221, 222 and thereby dampens oscillatory translation (i.e., vibration) of the rotor 210 away from the centre of the stator 220. This improves mechanical performance of the electrical machine 200 and reduces a likelihood of damage to the electrical machine 200 itself or to a mechanical system to which the rotor 210 is coupled during operation. In other words, the electric machine 200 functions as if it contained a contactless bearing which maintains alignment of the rotor 210 with respect to the stator 200 in use, the contactless bearing function being provided by an interaction between the alignment component of the magnetic field and the rotor poles of the rotor 210. The present disclosure therefore refers to the current which provides the translational force as an alignment current.

For ease of visualisation, each coil is shown as being radially offset from each other coil which forms part of the same stator tooth 221, 222 in FIG. 3. However, each coil may be intertwined with each other coil which forms part of the same stator tooth 221, 222 such that each coil which forms a part of each stator tooth 221, 222 is defined by approximately the same characteristic distance to the centre of the stator 220. In such a configuration, it follows that a mean average characteristic distance to the centre of the stator 220 of each of the coils in the first leg 410 is approximately equal to a mean average characteristic distance to the centre of the stator 220 of each of the coils in the second leg 420. More generally, in each leg 410, 420, a mean average characteristic distance to the centre of the stator 220 of each of the coils is approximately equal to a mean average characteristic distance to the centre of the stator 220 of each of the coils in each other leg 410, 420. This ensures that when the rotor 210 is aligned with the stator 220, the impedance of each of the coils is equal and the bridge circuit is balanced. Conversely, when the rotor 210 is misaligned with the stator 200, the magnitude of the potential difference between the intermediate junctions which arises as a result of the change in the magnitude of the impedance of the coils corresponds to the displacement of the central axis 201 of the rotor 210. It follows that the magnitude of the passively-instigated differential current which flows along a given alignment current path directly corresponds to the magnitude of the displacement of the central axis 201 of the rotor 210. Therefore, the magnitude of the translational force applied to the rotor 210 by the alignment component of the magnetic field generated by the coils as a result of the passively-instigated differential current corresponds to the translational displacement of the rotor 210 with respect to the stator 220. The application of this criterion therefore ensures that the translational force applied to the rotor 210 as a consequence of the passively-instigated differential current is a translational force suitable for maintaining alignment of the rotor 210 with respect to the stator 220.

Each alignment current path has a total positive electrical impedance which is composed of a positive electrical impedance provided by the coils of each leg 410, 420 as well as any additional positive electrical impedance provided by any further componentry of each alignment current path. In practice, the positive electrical impedance provided by the coils of each leg 410, 420 may be significantly greater than any additional positive electrical impedance provided by any further componentry of each alignment current path, such that the total positive impedance of each alignment current path may be considered to be approximately equal to, but not less than, the positive electrical impedance provided by the coils of each leg 410, 420 on the respective alignment current path.

The phase arrangement 300 further includes a negative impedance converter 350 positioned on the branch 341. The negative impedance converter 350 may also be referred to as a negative impedance device or a negative impedance converter. The negative impedance converter 350 is an active electrical component which is configured to add a negative electrical impedance to each alignment current path by introducing or "injecting" additional electrical energy into one of the alignment current paths, depending on whether the alignment current is flowing through the first alignment current path or the second alignment current path as appropriate. The negative impedance converter may be configured to add either an effective negative electrical resistance into one of the alignment current paths, an effective negative electrical reactance into one of the alignment current paths, or both an effective negative electrical resistance and an effective negative electrical reactance into one of the alignment current paths. Accordingly, the negative impedance converter 350 may function as either a negative resistor, a negative inductor or a combination of a negative resistor and a negative inductor.

The negative impedance converter 350 is generally configured to reduce an overall impedance of each alignment current path by adding a negative electrical impedance to the positive impedance of the alignment current path. As discussed above, the coils 411, 412, 421, 422 are generally configured to generate a magnetic field when a magnetising electric current is conducted therethrough. For this reason, each coil may generally have a substantial positive impedance (e.g., resistance and/or inductance) due to, for instance, a large number of turns of the coil required to produce a sufficiently large magnetic field for driving the rotor 210. In a previously-considered electric machine, the positive impedance of the alignment current path provided by the coils limits the magnitude of the alignment current such that the magnitude of the translational force applied to the rotor 210 for maintaining alignment of the rotor 210 with respect to the stator 220 is correspondingly limited. In contrast, the electric machine 200 of the present disclosure provides for the magnitude of the translational force applied to the rotor 210 to be sufficient to overcome an external force applied to the rotor 210, and thereby return the central axis 201 of the rotor 210 toward a position which is closer to the centre of the stator 220, by making use of the negative impedance converter 350 to reduce the total impedance of the alignment current path. Consequently, the electric machine 200 is able to more effectively maintain alignment of the rotor 210 with respect to the stator 220 and/or more effectively dampen any vibration of the rotor 210 in use.

The negative impedance converter 350 may comprise, for instance, an operational-amplifier circuit as described in H. Ma and B. Yan, "Nonlinear damping and mass effects of electromagnetic shunt damping for enhanced nonlinear vibration isolation," Mechanical Systems and Signal Processing, vol. 146, p. 107010, 2021 or X. Zhang, H. Niu and B. Yan, "A novel multimode negative inductance negative resistance shunted electromagnetic damping and its application on a cantilever plate," Journal of Sound and Vibration, vol. 331, No. 10, pp. 2257-2271, 2012. Such operational-amplifier circuits provide a simple and robust implementation of the negative impedance converter 350. Additionally, such operational-amplifier circuits enable a magnitude of the effective negative impedance of the negative impedance converter 350 to be controlled by controlling the additional electrical energy introduced to the alignment current path by the negative impedance converter 350. Otherwise, the negative impedance converter 350 may have another suitable electrical topology as discussed below with reference to FIG. 4.

Figure 4:
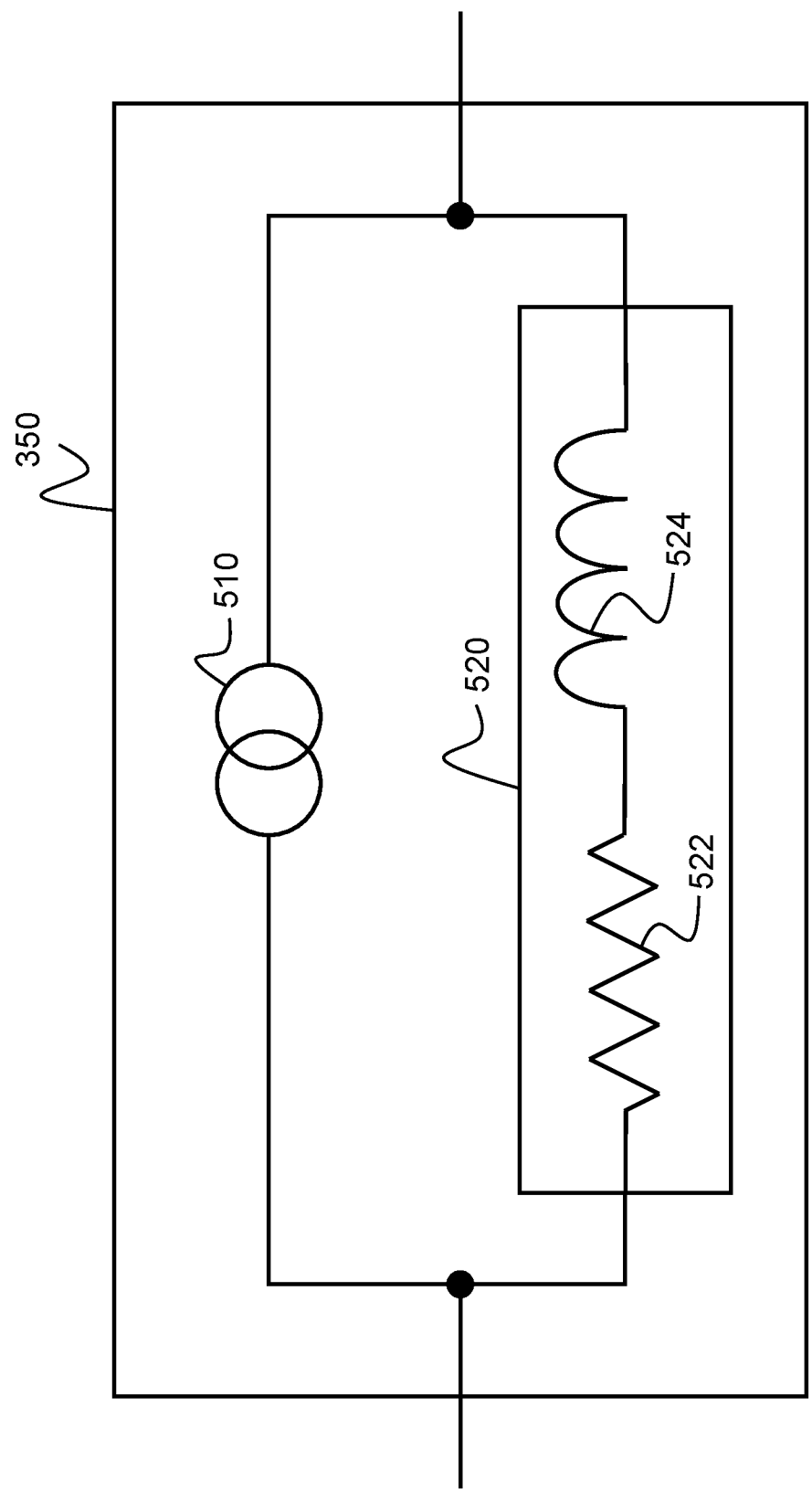
FIG. 4 is a circuit diagram which shows an internal electrical topology of an example negative impedance converter.

FIG. 4 is a circuit diagram which shows an internal electrical topology of an example negative impedance converter 350 comprising a current source 510 and a ballast impedance converter 520 connected in parallel at a first junction 511 and a second junction 512. In turn, the ballast impedance converter 520 comprises a ballast resistor 522 and a ballast inductor 524 connected in series.

For the purpose of the following discussion, the negative impedance converter 350 is considered to have a total effective impedance denoted by $Z_t$, a net total current passing out of the negative impedance converter is considered to be $I_t$ and a voltage change across the negative impedance converter 350 is represented by V. Similarly, the ballast impedance converter 520 has a ballast impedance $Z_b$ and a current passing through the ballast impedance converter is labelled as $I_b$. Finally, an electric current provided by the current source 510 is denoted by $I_s$. By analysing the current flows in and out of the second junction 512 using Kirchhoff's current law, it is apparent that $I_s = I_t + I_b$. After applying Ohm's law to the right hand side of this equation, this may then be expressed as $I_s = (V/Z_t) + (V/Z_b)$. Using this equation, the magnitude of the electric current provided by the current source 510 required to achieve a total effective impedance of $-Z_t$ may be determined. Accordingly, by varying the magnitude of the electric current provided by the current source 510, the magnitude of the effective negative impedance added to the alignment current path by the negative impedance converter 350 may be controlled.

The current source 510 may comprise a switched-mode power-electronic drive. Such an arrangement provides an especially energy efficient current source 510 for incorporation within the negative impedance converter 350, which in turn improves an energy efficiency of the electric machine 200. However, such arrangements may increase a complexity of the negative impedance converter 350 compared to, for instance, a negative impedance converter 350 comprising an operational-amplifier circuit as discussed above. Nevertheless, in various applications of the electric machine 200 where energy efficiency is highly advantageous (such as in the context of aircraft and aircraft propulsion systems), the benefits provided by an improved energy efficiency of the electric machine 200 may outweigh any drawbacks associated with the increased complexity of the electric machine 200.

Returning now to FIGS. 2 and 3, the negative impedance converter 350 may be configured to control the additional energy introduced to the alignment current path such that the magnitude of the effective negative impedance added to the alignment current path by the negative impedance converter 350 is less than a magnitude of the total positive electrical impedance of the alignment current path. As a result, the magnitude of the effective negative impedance added to the alignment current path by the negative impedance converter 350 is never greater than the total positive impedance of the alignment current path, which would result in the overall electrical impedance of the alignment current path being negative. If this were the case, the negative impedance converter 350 would immediately begin providing an incrementally increasing amount of electrical energy to the alignment current path as soon as a potential difference between the intermediate junctions 321, 322 arose, which would cause the negative impedance converter 350 to rapidly reach and operate at a maximum power-rating whenever an alignment current flowed across the branch 341 due to the potential difference between the intermediate junctions 321, 322. This is associated with various disadvantages, including a reduced energy efficiency of the electrical machine 200 and a reduced mean time between failures (MTBF) of the negative impedance converter 350.

The negative impedance converter 350 may also be configured to control the additional electrical energy introduced to the alignment current path such that the magnitude of the negative electrical impedance added to the alignment current path by the negative impedance converter 350 is equal to a target value. The target value may be chosen to ensure that the overall impedance of the alignment current path is sufficiently low such that the potential difference which arises between the intermediate junctions 321, 322 results in a sufficiently large current flowing across the branch 341 which in turn causes the application of a translational force to the rotor 210 of sufficient strength for maintaining alignment of the rotor 210 with respect to the stator 220. The target value may also be chosen to ensure that a safety margin between the magnitude of the negative electrical impedance added to the alignment current path by the negative impedance converter and the magnitude of the total positive impedance of the alignment current path is maintained. In particular, the target value may be expressed as a fraction of the total positive impedance of the alignment current path. For example, the target value may be between 70% and 99% of the total positive impedance of the alignment current path. Preferably, the target value may be between 90% and 99% of the total positive impedance of the alignment current path. More preferably, the target value may be approximately 95% of the total positive impedance of the alignment current path such that the magnitude of the negative electrical impedance added to the alignment current path by the negative impedance converter 350 is no greater than 95% of the magnitude of the total positive electrical impedance of the alignment current path. This provides a simple, precise and effective control regime for the negative impedance converter 350 in use.

The negative impedance converter 350 may comprise or be configured to access a memory which stores a predetermined value for the total positive impedance of the alignment current path based on the theoretically or experimentally assessed impedance values of each of the coils at particular rated conditions, along with similar impedance values for any other components of the alignment current path. The negative impedance converter 350 may control (and be configured to control) the additional energy introduced to the alignment current path based on the stored predetermined total positive impedance value of the alignment current path to achieve the control objectives outlined above. The negative impedance converter 350 may comprise any suitable processing circuitry and machine-readable instructions for reading the predetermined total positive impedance value and responsively performing the associated control.

The electric machine 200 may further comprise a monitoring arrangement 391 which is configured to determine the total positive electrical impedance of each alignment current path. The total positive impedance of each alignment current path is equal to the total equivalent series impedance of the phase arrangement 300, 300' between the first primary junction 311 and the second primary junction 312 if the negative impedance converter 350 were not present. The negative impedance converter 350 may control the additional electrical energy introduced to the alignment current path at the intermediate junctions 321, 322 based on the determined positive electrical impedance of the alignment current path. This arrangement provides that the negative impedance converter 350 is able to effectively control the magnitude of the negative electrical impedance added to the alignment current path so that the magnitude of the negative electrical impedance introduced to the alignment current path is always less than the magnitude of the total positive electrical impedance of the alignment current path, and optionally is always equal to the predetermined target value, across a wide range of operating states of the electrical machine 200.

The total positive electrical impedance of each alignment current path may vary according to an operating state of the electrical machine 200. In particular, it may be that the electrical resistance of the coils 411, 412, 421, 422 is primarily dependent on the temperature of the coils 411, 412, 421, 422. For example, for coils which are formed using copper as the electrically conductive material, the resistance of the coils may change by approximately a factor of two as the temperature of the coils varies by 100° C. The electrical inductance of the coils may also be temperature dependent, albeit to a lesser extent than the electrical resistance of the coils. The temperature of the coils is generally related to resistive heat dissipation within the phase arrangement as a result of the motor current(s) through them, which typically have a significantly larger magnitude than the alignment current as described above. It follows that when the magnitude of the motor currents is increased (such as when the torque applied to the rotor 210 is increased), the temperature of the coils also increases. In typical use, the resistive heat dissipation associated with the motor currents may cause the variation in the temperature of the coils to be sufficiently large so that the related variation of the impedance of the coils is significant.

The monitoring arrangement 391 may determine the total positive impedance of each alignment current path by directly monitoring the impedance of each leg 410, 420 or each coil 411, 412, 421, 422. Otherwise, the monitoring arrangement 391 may determine the total positive impedance of each alignment current path by monitoring a temperature of the electric machine 200 and subsequently evaluating a mathematical relationship between the temperature of the electric machine 200 and the positive impedance of each alignment current path. The temperature of the electric machine 200 is generally representative of the temperature of the coils 411, 412, 421, 422, and may be a temperature of any of the coils themselves or it may be a temperature of the stator teeth 221, 222 which is directly related to the temperature of the coils 411, 412, 421, 422, or a thermally coupled component. The mathematical relationship may take the form of an analytical relationship or a numerical relationship. The analytical relationship may take the form of an algebraic equation. The numerical relationship may be represented by a look-up table or similar stored in a memory of the monitoring arrangement 391, such that the monitoring arrangement 391 is able to reference the look-up table so as to determine the positive impedance of each alignment current path based on the monitored temperature of the electrical machine 200.

Figure 5:
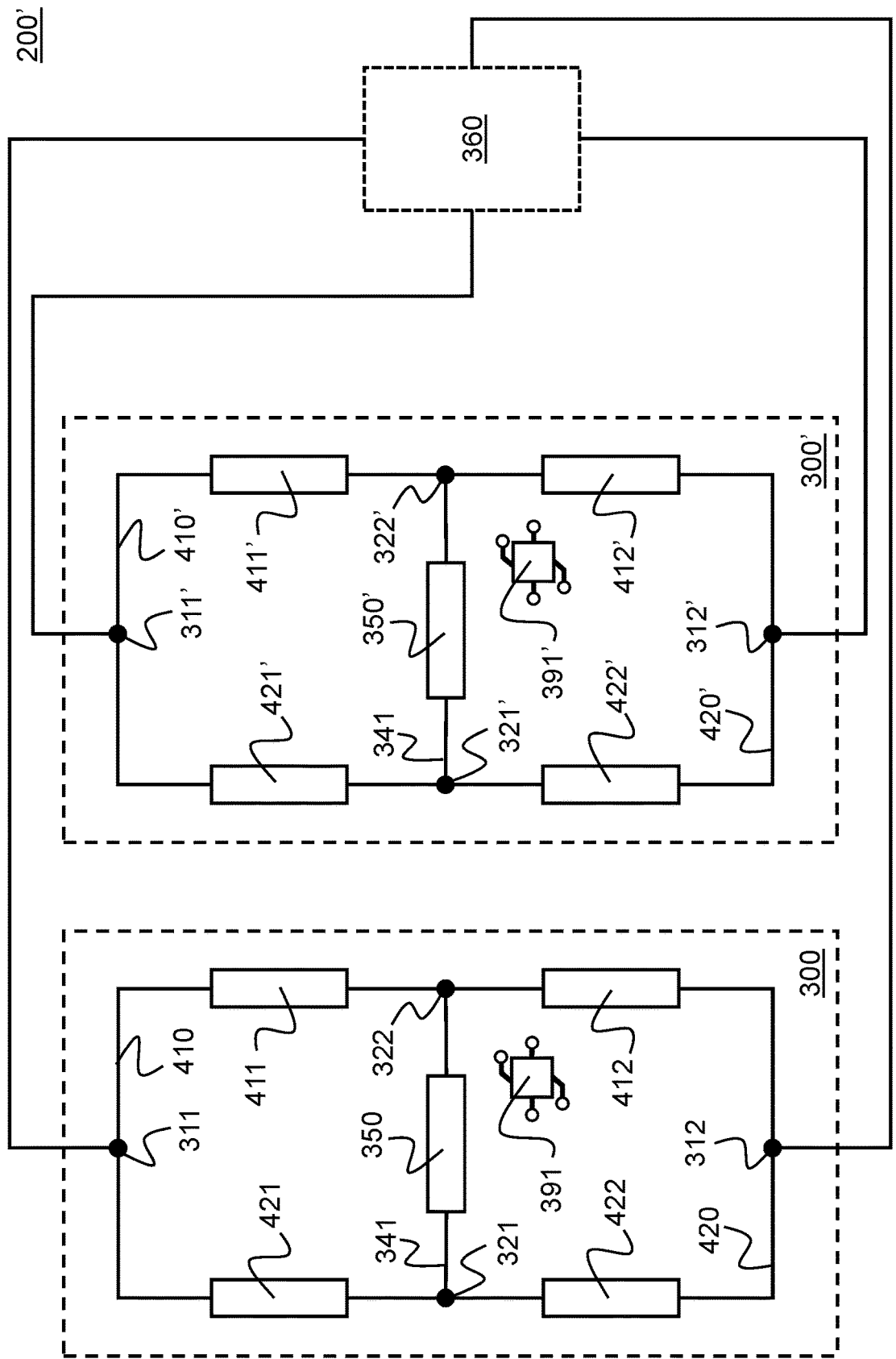
FIG. 5 is a circuit diagram which shows an electrical topology of a further example electric machine.
Figure 6:
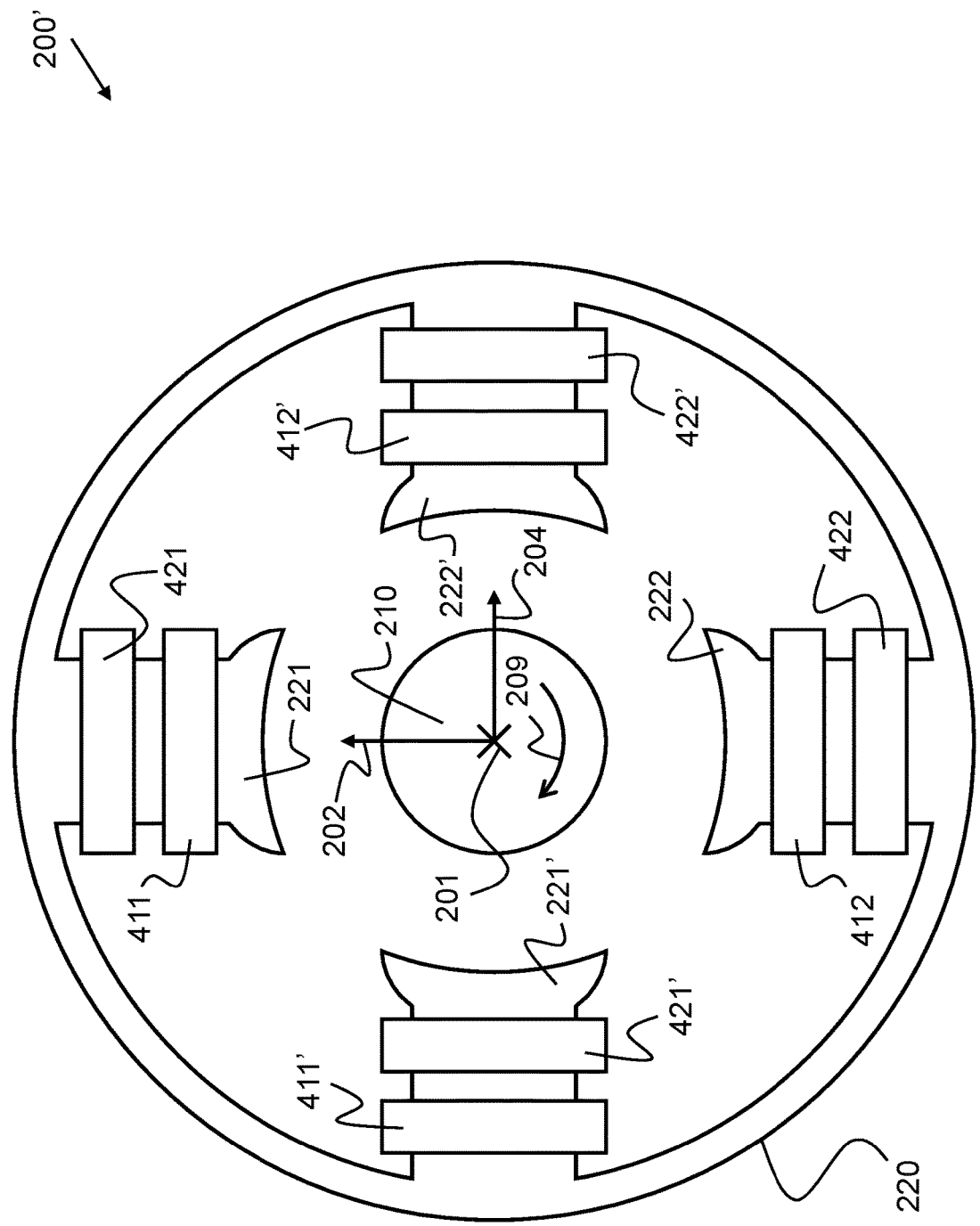
FIG. 6 shows a cross-sectional view of the further example electric machine of FIG. 5.

FIG. 5 is a circuit diagram which shows an electrical topology of a further example rotary electric machine 200'. FIG. 6 shows a schematic cross-sectional view of the further example rotary electric machine 200'. Components of the electric machine 200' will be described with reference to both FIGS. 5 and 6.

The further example electric machine 200' is generally similar to the example electric machine 200 described above with reference to FIGS. 2 to 4, with like reference signs indicating common or similar features. However, in the further example electric machine 200', the phase arrangement 300 is a first phase arrangement 300 and the electric machine 200' further comprises a second phase arrangement 300' such that the electric machine 200' comprises a plurality of phase arrangements 300, 300'. The second phase arrangement 300' is similar to the first phase arrangement 300, with common or similar features being indicated by corresponding reference numerals distinguished by the prime symbol ('). Collectively, the first phase arrangement 300 and the second phase arrangement 300' may be referred to as a winding of the electric machine 200'.

In addition, in the example of FIGS. 5 and 6, the set of stator teeth 221, 222 is a first set of stator teeth 221, 222 and the electric machine 200' also comprises a second set of stator teeth 221', 222' such that the electric machine 200' comprises a plurality of sets of stator teeth. The second set of stator teeth 221', 222' is similar to the first set of stator teeth 221, 222, with common or similar features also being indicated by corresponding reference numerals distinguished by the prime symbol ('). Each set of stator teeth 221, 222, 221', 222' is angularly offset with respect to each other set of stator teeth 221, 222, 221', 222' around a circumference of the stator 220 (and therefore are angularly offset with respect to each other set of stator teeth 221, 222, 221', 222' around the rotor 210). Each of the plurality of sets of stator teeth 221, 222, 221', 222' is provided with a respective phase arrangement 300, 300' of the plurality of phase arrangements 300, 300'.

The input system 360 is electrically connected to the first primary junction 311 and the second primary junction 312 of the first-leg first phase arrangement 300 as well as the first primary junction 311' and the second primary junction 312' of the first-leg second phase arrangement 300'. The input system 360 is configured to provide a first AC input voltage to the primary junctions 311, 312 of the first-leg first phase arrangement 300 and to provide a second AC input voltage to the primary junctions 311', 312' of the first-leg second phase arrangement 300'.

In particular, the input system 360 shown in FIG. 5 is provided with four separate terminals. Therefore, the input system 360 may be operated so that a phase of the first AC input voltage is different to a phase of the second AC input voltage. Consequently, the electric machine 200' may be operated as a two-phase electric machine. However, it will be appreciated that the electric machine 200' may comprise any suitable number of phase arrangements in the manner described above, and the input system 360 may be provided with an appropriate number of terminals such that the input system 360 is electrically connected to the first primary junction and the second primary junction of each phase arrangement such that the electric machine 200' is operable as a polyphase electric machine. As an example, the electric machine may comprise three phase arrangements, and the input system 360 may be provided with three separate terminals such that the electric machine 200 may be operated as a three-phase electric machine. Operation of the electric machine 200' as a polyphase electric machine may enable smoother and/or more consistent mechanical power transfer to a mechanical system which is coupled to the rotor 210 as the rotor 210 rotates relative to the stator 220 relative to the central axis 201.

In particular, the input system 360 may be configured so that a phase of the first AC input voltage is different to a phase of the second AC input voltage. Consequently, the electric machine 200' may be operated as a polyphase electric machine in use. Operation of the electric machine 200' as a polyphase electric machine may enable smoother and/or more consistent mechanical power transfer to a mechanical system which is coupled to the rotor 210 as the rotor 210 rotates relative to the stator 220 relative to the central axis 201.

Although it has been described that each coil is wound around a respective stator tooth (or plurality of stator teeth), the disclosure envisages implementations in which this is not the case. For example, it may be that each coil is wound around a magnetic material within the respective stator tooth (or plurality of stator teeth), such that each coil is disposed within the respective stator tooth (or plurality of stator teeth) and that each coil is arranged coaxially with each other coil which forms part of the same stator tooth.

While the negative impedance converter 350 has been shown and described as being positioned on the branch 341, the disclosure envisages implementations in which this is not the case. It may otherwise be that the negative impedance converter 350 is one of a plurality of negative impedance converters provided to the or each phase arrangement 300, each of the plurality of negative impedance converters being connected in series with each coil 411, 412, 421, 422 of each leg 410, 420. However, this would increase a part count and therefore a complexity of the electric machine 200, 200'. Further, in such an arrangement, each of the negative impedance converters would need to be rated to accommodate both the motor current passing through the respective coil and the alignment current which is superimposed onto it, which would necessitate larger and more complex individual negative impedance converters.

Despite the fact that the ballast impedance converter 520 has been described as comprising the ballast resistor 522 and the ballast inductor 524 connected in series, the disclosure envisages implementations in which this is not the case. For example, it may be that the ballast resistor 522 and the ballast inductor 524 are otherwise connected (e.g., in parallel). In addition, it may be that the ballast impedance converter 520 only comprises the ballast resistor 522 (i.e., does not comprise the ballast inductor 524), such that the ballast impedance converter 520 may be referred to as a ballast resistor 520. Further, it may be that the ballast impedance converter only comprises the ballast inductor 524 (i.e., does not comprise the ballast resistor 522), such that the ballast impedance converter 520 may be referred to as a ballast inductor 520.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

The invention claimed is:

1. An electric machine comprising a stator, and a rotor configured to rotate relative to the stator, the stator having a phase arrangement, wherein:
the phase arrangement includes a first leg and a second leg connected in parallel at a first primary junction and a second primary junction;
the first leg includes a first-leg first coil and a first-leg second coil connected in series through a first intermediate junction;
the second leg includes a second-leg first coil and a second-leg second coil connected in series through a second intermediate junction, the first intermediate junction and the second intermediate junction being connected by a branch such that the phase arrangement is in the form of a bridge circuit;
the phase arrangement is configured to conduct, through each leg, a motor current through the respective in series coils between the first primary junction and the second primary junction;
the phase arrangement is configured to permit an alignment current to flow between the first primary junction and the second primary junction via the branch, the alignment current being conducted through an alignment current path which passes through one coil of each leg while bypassing at least one other coil of each leg;
the alignment current path has a positive electrical impedance provided by the coils of each leg;
the phase arrangement includes a negative impedance converter configured to add a negative electrical impedance to the alignment current path by introducing additional electrical energy into the alignment current path; and
the electric machine is configured so that:
the motor currents cause a torque to be applied to the rotor for rotation relative to the stator, and
the alignment current causes a translational force to be applied to the rotor, the translational force counteracting a force that acts on the rotor in a direction that would bring the rotor out of alignment with the stator, the translational force thereby maintaining alignment of the rotor with respect to the stator.

2. The electric machine of claim 1, wherein the negative impedance converter is configured to control the additional electrical energy introduced to the alignment current path such that a magnitude of the negative electrical impedance added to the alignment current path is less than a magnitude of a total positive electrical impedance of the alignment current path.

3. The electric machine of claim 2, wherein the negative impedance converter is configured to control the additional electrical energy introduced to the alignment current path such that the magnitude of the negative electrical impedance added to the alignment current path is no greater than 95% of the magnitude of the total positive electrical impedance of the alignment current path.

4. The electric machine of claim 2, further comprising a monitoring arrangement configured to determine the positive electrical impedance of each alignment current path, and wherein the respective negative impedance converter is configured to control the additional electrical energy introduced to the alignment current path based on the determined positive electrical impedance of the alignment current path.

5. The electric machine of claim 1, wherein the negative impedance converter is positioned on the branch connecting the first intermediate junction and the second intermediate junction.

6. The electric machine of claim 1, wherein the negative impedance converter comprises a current source and a ballast impedance converter connected in parallel.

7. The electric machine of claim 6, wherein the ballast impedance converter includes a ballast resistor and/or a ballast inductor.

8. The electric machine of claim 6, wherein the current source includes a switched-mode power-electronic drive.

9. The electric machine of claim 1, wherein the negative impedance converter comprises an operational amplifier circuit.

10. The electric machine of claim 1, wherein:
the stator comprises a set of stator teeth, the set of stator teeth including a first stator tooth and a second stator tooth diametrically opposed to one another;
the phase arrangement is provided to the set of stator teeth such that:
the first-leg first coil and the second-leg first coil form part of a first stator tooth coil-grouping,
the first-leg second coil and the second-leg second coil form part of a second stator tooth coil-grouping, and
each stator tooth coil-grouping is provided to at least one stator tooth of the set of stator teeth.

11. The electric machine of claim 10, wherein each stator tooth comprises a soft magnetic material.

12. The electric machine of claim 10, wherein
the set of stator teeth is one of a plurality of sets of stator teeth;
each set of stator teeth is angularly offset with respect to each other around a circumference of the stator; and
the stator includes a plurality of the phase arrangements, each respective one of the phase arrangements being provided to a respective set of stator teeth.

13. The electric machine of claim 12, further comprising an input system configured to provide a respective alternating-current voltage to each phase arrangement, each alternating-current voltage having a different phase.

14. A gas turbine engine comprising the electric machine of claim 1, wherein the rotor of the electric machine is mechanically coupled to a spool of the gas turbine engine.

15. The gas turbine engine of claim 14, wherein the rotor of the electric machine is arranged coaxially with the spool of the gas turbine engine.

16. An electric machine comprising a stator, a rotor configured to rotate relative to the stator, the stator having a phase arrangement, wherein:
the phase arrangement includes a first leg and a second leg connected in parallel at a first primary junction and a second primary junction;
the first leg includes a first-leg first coil and a first-leg second coil connected in series through a first intermediate junction;
the second leg includes a second-leg first coil and a second-leg second coil connected in series through a second intermediate junction, the first intermediate junction and the second intermediate junction being connected by a branch such that the phase arrangement is in the form of a bridge circuit;
the phase arrangement is configured to conduct, through each leg, a motor current through the respective in series coils between the first primary junction and the second primary junction;
the phase arrangement is configured to permit an alignment current to flow between the first primary junction and the second primary junction via the branch, the alignment current being conducted through an alignment current path which passes through one coil of each leg;
the alignment current path has a positive electrical impedance provided by the coils of each leg;
the phase arrangement includes a negative impedance converter configured to add a negative electrical impedance to the alignment current path by introducing additional electrical energy into the alignment current path;
the electric machine is configured so that:
the motor currents cause a torque to be applied to the rotor for rotation relative to the stator, and
the alignment current causes a translational force to be applied to the rotor for maintaining alignment of the rotor with respect to the stator;
the negative impedance converter is configured to control the additional electrical energy introduced to the alignment current path such that a magnitude of the negative electrical impedance added to the alignment current path is less than a magnitude of a total positive electrical impedance of the alignment current path; and
the negative impedance converter is configured to control the additional electrical energy introduced to the alignment current path such that the magnitude of the negative electrical impedance added to the alignment current path is no greater than 95% of the magnitude of the total positive electrical impedance of the alignment current path.

* * * * *